US011029965B2

(12) United States Patent
Pelner et al.

(10) Patent No.: US 11,029,965 B2
(45) Date of Patent: Jun. 8, 2021

(54) BOOTING FIRMWARE FROM EXPANSION BLOCK STORAGE DEVICES

(71) Applicant: Intel Corporation, Santa Clara, CA (US)

(72) Inventors: Jenny Pelner, Phoenix, AZ (US); James Pelner, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 61 days.

(21) Appl. No.: 16/354,306

(22) Filed: Mar. 15, 2019

(65) Prior Publication Data

US 2019/0213013 A1  Jul. 11, 2019

(51) Int. Cl.
*G06F 9/00* (2006.01)
*G06F 9/4401* (2018.01)
*G06F 13/16* (2006.01)
*G06F 3/06* (2006.01)

(52) U.S. Cl.
CPC .......... *G06F 9/4401* (2013.01); *G06F 3/0604* (2013.01); *G06F 3/0629* (2013.01); *G06F 3/0673* (2013.01); *G06F 9/4403* (2013.01); *G06F 13/1684* (2013.01); *G06F 9/4406* (2013.01)

(58) Field of Classification Search
CPC ........ G06F 9/4401; G06F 3/604; G06F 3/629; G06F 3/673; G06F 9/4403; G06F 13/1684
USPC .......................................................... 713/2
See application file for complete search history.

(56) References Cited

U.S. PATENT DOCUMENTS

| | | | | |
|---|---|---|---|---|
| 6,779,110 B1 * | 8/2004 | Aguilar | ................. | G06F 9/4416 709/222 |
| 10,061,599 B1 * | 8/2018 | Yakovlev | ............ | G06F 13/4221 |
| 2003/0018892 A1 * | 1/2003 | Tello | ..................... | G06F 21/123 713/164 |
| 2004/0098516 A1 * | 5/2004 | Eidson | .................. | G06F 9/4403 710/1 |
| 2005/0278563 A1 * | 12/2005 | Durham | .............. | G06F 11/2294 714/4.1 |
| 2007/0011491 A1 * | 1/2007 | Govindarajan | ......... | G06F 21/57 714/27 |
| 2008/0183906 A1 * | 7/2008 | Leigh | .................. | G06F 13/4022 710/8 |
| 2012/0054378 A1 * | 3/2012 | Malamant | ........... | G06F 13/4295 710/19 |

(Continued)

OTHER PUBLICATIONS

Wikipedia, "PCI Configuration Space", <en.wikipedia.org/w/index.php?title=PCI_configuration_space&oldid=878324442>, retrieved Feb. 12, 2019, 6 pages.

*Primary Examiner* — Volvick Derose
(74) *Attorney, Agent, or Firm* — Jordan IP Law, LLC

(57) ABSTRACT

Systems, apparatuses and methods may provide for technology to determine one or more default values associated with a block storage device and automatically retrieve boot code from the block storage device in accordance with the default value(s), wherein the boot code is retrieved via an expansion bus. In an example, the default value(s) include bus number information and address information, wherein the address information corresponds to a bus header of the block storage device. Moreover, the block storage device may be dedicated to the bus controller and retrieval of the boot code from the block storage device may bypass a bus enumeration procedure.

17 Claims, 2 Drawing Sheets

(56) References Cited

U.S. PATENT DOCUMENTS

2015/0280749 A1* 10/2015 Gjorup ................ G06F 11/1072
                                                    714/752
2016/0055068 A1*  2/2016 Jeansonne ............. G06F 3/0683
                                                    714/15
2016/0364570 A1* 12/2016 Stern ...................... G06F 21/575
2017/0322816 A1* 11/2017 Parthiban .............. G06F 9/4416

* cited by examiner

BOOTING FIRMWARE FROM EXPANSION BLOCK STORAGE DEVICES

TECHNICAL FIELD

Embodiments generally relate to memory structures. More particularly, embodiments relate to booting firmware from expansion block storage devices.

BACKGROUND

Booting a computing system (e.g., after a system reset) may involve executing BIOS (basic input output system) firmware instructions stored in an SPI (serial peripheral interconnect) flash memory. The SPI flash memory increases the bill of materials (BOM) and overall cost of the computing system. Moreover, the relatively slow operating speed of the SPI flash memory may give rise to latency concerns, which may be particularly problematic in, for example, an Internet of Things (IoT) environment having tight latency constraints.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
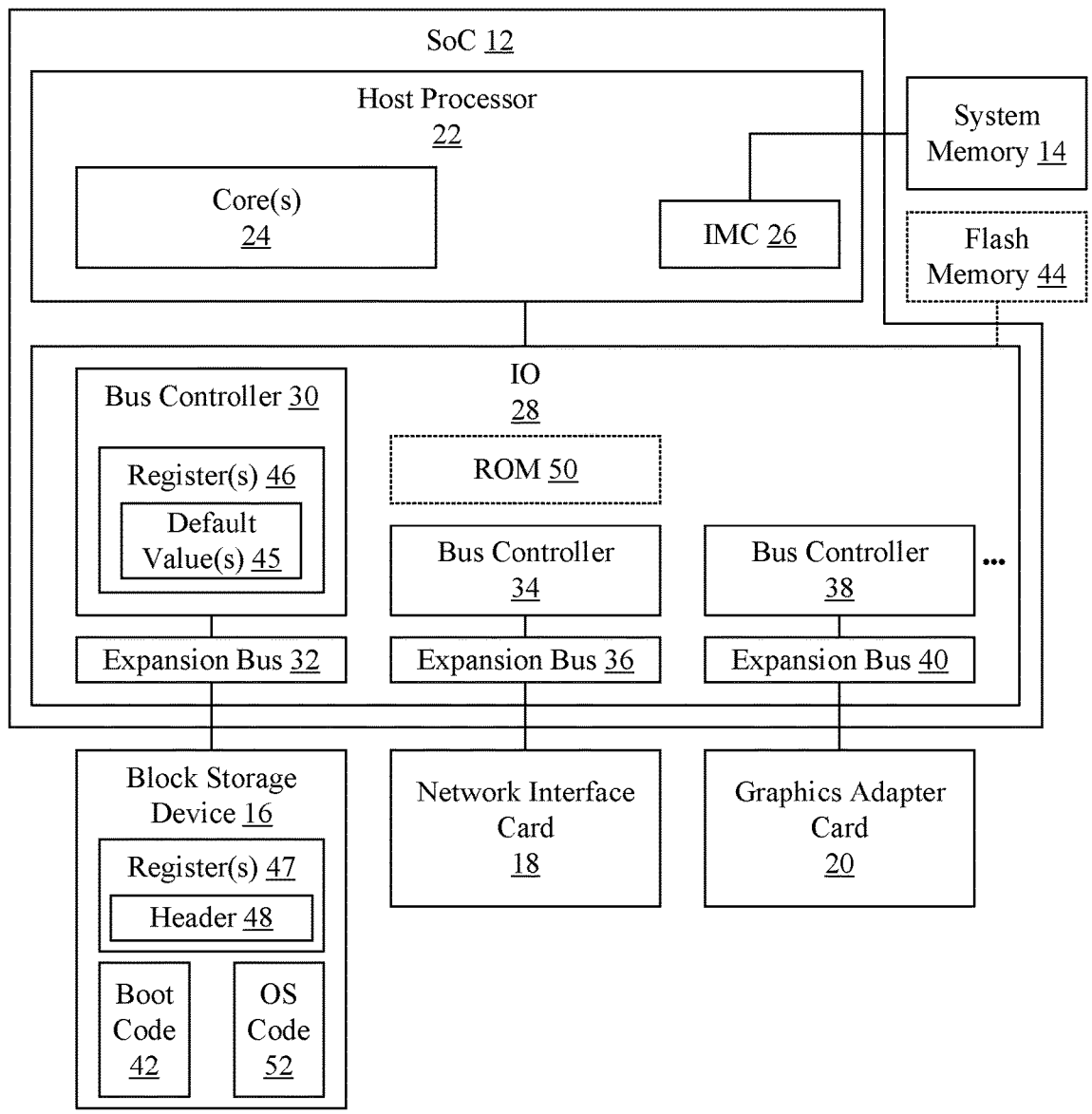
FIG. 1 is a block diagram of an example of a performance-enhanced computing system according to an embodiment.

Turning now to FIG. 1, a performance-enhanced computing system 10 is shown in which a system on chip (SoC) 12 is coupled to a system memory 14 (e.g., dynamic random access memory/DRAM), a block storage device 16, a network interface card (NIC) 18 and a graphics adapter card 20. The computing system 10 might be part of a server, desktop computer, notebook computer, tablet computer, convertible tablet, smart television (TV), personal digital assistant (PDA), mobile Internet device (MID), smart phone, wearable device, media player, vehicle, robot, IoT device, etc., or any combination thereof. In the illustrated example, the SoC 12 includes a host processor 22 (e.g., central processing unit/CPU) having one or more cores 24 and an integrated memory controller (IMC) 26 communicatively coupled to the system memory 14. The SoC 12 may also include an input/output (IO) module 28 having a first bus controller 30 (e.g., including logic instructions, configurable logic, fixed-functionality hardware logic, etc., or any combination thereof) coupled to a first expansion bus 32, a second bus controller 34 coupled to a second expansion bus 36, a third bus controller 38 coupled to a third expansion bus 40, and so forth.

The block storage device 16 may generally use non-volatile memory (NVM) such as solid state disks (SSDs) to store data in volumes, also referred to as blocks, wherein each block may act as an individual hard drive that is configurable by a storage administrator. In an embodiment, the block storage device 16 is compliant with NVMe (NVM Express) and the first expansion bus 32 is a PCI-e (Peripheral Components Interconnect Express) bus. In such a case, the block storage device 16 connects directly to the first expansion bus 32 via a unified software stack designed for NVM-based storage transactions over PCI-e.

The illustrated block storage device 16 includes boot code 42 such as, for example, UEFI (Unified Extensible Firmware Interface) BIOS, coreboot and/or custom bootloader firmware instructions. As will be discussed in greater detail, the illustrated first bus controller 30 determines one or more default values 45 associated with the block storage device 16 and retrieves the boot code 42 from the block storage device 16 in accordance with the default value(s) 45, wherein the boot code 42 is retrieved via the first expansion bus 32. In an embodiment, the default value(s) 45 are initially determined during the design of system 10 (e.g., "pre-silicon"). The default value(s) 45 may include, for example, bus number information (e.g., primary bus number/PBN, secondary bus number/SCBN, subordinate bus number/SBBN, and so forth), address information (e.g., memory base and limit/MBL, prefetchable memory base and limit/PMBL, prefetchable memory base upper/PMBU, prefetchable memory base limit upper/PMLU, and so forth), etc., or any combination thereof. Prefetchable memory is memory that the host processor 22 can request in advance as an optimization before code operates on it. For example, the host processor 22 might predict that the prefetchable memory may be needed in the future or the code executed by the host processor 22 may contain explicit prefetch instructions. As will be discussed in greater detail, the default value(s) 45 may correspond to a header 48 stored in one or more registers 47 on the block storage device 16.

Thus, when a "power on" signal is received, the default value(s) 45 generally enable the first bus controller 30 to initiate retrieval of the boot code 42 from the block storage device 16 immediately upon completion of bus training and prior to any bus enumeration procedure that takes place with respect to, for example, the second expansion bus 36, the third expansion bus 40, and so forth. Moreover, the operating speed (e.g., 16 GB/sec) of the block storage device 16 is substantially higher than, for example, the operating speed (e.g., 400 Mb/sec) of a flash memory 44 (e.g., SPI flash memory). The computing system 10 may therefore be considered performance-enhanced to the extent that booting from the block storage device 16 is faster than booting from the flash memory 44. Indeed, significant cost savings may be achieved by eliminating the flash memory 44 from the system 10 BOM altogether.

In one embodiment, the first bus controller 30 retrieves the default value(s) 45 from one or more configuration registers 46 within the first bus controller 30. For example, in a PCI-e environment, the configuration register(s) 46 might be hardcoded with the default value(s) 45 according to a layout as shown in Table I.

TABLE I

| Offset Start | Offset End | Register Name (ID)—Offset | Default Value |
|---|---|---|---|
| 0h | 3h | Identifiers (ID)—Offset 0h | XXXX8086h |
| 4h | 7h | Device Command and Primary Status (CMD_PSTS)—Offset 4h | 00000006h |
| 8h | 8h | Revision ID and Class Code (RID_CC)—Offset 8h | 60400FXh |

TABLE I-continued

| Offset Start | Offset End | Register Name (ID)—Offset | Default Value |
|---|---|---|---|
| Ch | Fh | Cache Line Size, Primary Latency Timer and Header Type (CLS_PLT_HTYPE)—Offset Ch | 810000h |
| 18h | 18h | Bus Numbers and Secondary Latency Timer (BNUM_SLT)—Offset 18h | 00XXXX00h or 00010100h |
| 1Ch | 1Fh | I/O Base and Limit and Secondary Status (IOBL_SSTS)—Offset 1Ch | 0h |
| 20h | 13h | Memory Base and Limit (MBL)—Offset 20h | 0h |
| 24h | 27h | Prefetchable Memory Base and Limit (PMBL)—Offset 24h | 0xD0000001h |
| 28h | 2Bh | Prefetchable Memory Base Upper 32 Bits (PMBU32)—Offset 28h | 0h |
| 2Ch | 2Fh | Prefetchable Memory Limit Upper 32 Bits (PMLU32)—Offset 2Ch | 0h |
| 34h | 37h | Capabilities List Pointer (CAPP)—Offset 34h | 40h |
| 3Ch | 3Fh | Interrupt Information and Bridge Control (INTR_BCTRL)—Offset 3Ch | 0h |

The default value(s) 45 of the configuration register(s) 46 may generally be hardcoded to correspond to (e.g., be compatible with and/or match) the header 48 of the block storage device 16. For example, the following settings might be made to the configuration register(s) 46 in the bus controller 30. For register offset 0x04: the Device Command Register bit 1 would be set (e.g., memory space enable/MSE) and bit 2 would be set (e.g., bus master enable/BME); for register offset 0x18: Bus Number bits 8 through 15 for the secondary bus number (e.g., bus number of the port) and bits 16 through 23 for the subordinate bus number (e.g., highest PCI bus number below the bridge) would match the secondary and subordinate values in the header 48 of the register(s) 47 (e.g., 00000001h if bus 1 is used); for register offset 0x20: there may be a change if the memory base and limit are both below 4 GB (e.g., for 32-bit addressing); for register offset 0x24: the Prefetchable Memory Base and Limit (e.g., lower 32 bits of the memory range and limit) would match the PMBL value in the header 48 of the register(s) 47; for register offset 0x28: the Prefetchable Memory Base (e.g., upper 32 bits of the memory range) would match the PMBU value in the header 48 of the register(s) 47; and for register offset 0x2C: the Prefetchable Memory Limit (e.g., upper 32 bits of the memory limit) would match the PMBL value in the header 48 of the register(s) 47. In the configuration register(s) 47 of the block storage device 16, the Device Command Register bit 1 would be set (e.g., MSE) and bit 2 would not be set (e.g., BME). As a result of the hardcoded settings in the configuration register(s) 46, the bus configuration is compatible and the address information in the header 48 matches the address information of the default value(s) 45. These changes would therefore enable the first bus controller 30 to communicate with the block storage device 16 without conducting bus enumeration.

In another example, the first bus controller 30 retrieves the default value(s) 45 from a read only memory (ROM) 50 of the IO module 28. In such a case, the ROM 50 would be used to manage link training errors and/or assign resources to the first expansion bus 32 (e.g., PCI-e root port) and the block storage device 16 (e.g., NVMe device). In an embodiment, the second bus controller 34, the second expansion bus 36, the NIC 18, the third bus controller 38, the third expansion bus 40, and the graphics adapter card 20 also include appropriate headers (not shown) to facilitate communication between the devices.

Additionally, the block storage device 16 may be dedicated to the first bus controller 30. For example, only the first bus controller 30 (e.g., device/function D28/F0) is able to connect to the block storage device 16 and neither the second bus controller 34 nor the third bus controller 38 would be able to connect to the block storage device 16 in such a case. Dedicating the block storage device 16 to the first bus controller 30 may simplify the design of the SoC 12. In one example, the bus controller 30 also retrieves operating system (OS) code 52 from the block storage device 16 via the first expansion bus 32 and sends the OS code 52 to the host processor 22 for execution.

In an embodiment, the block storage device 16 is mass storage containing a memory structure that may store the boot code 42 and the OS code 52 in non-volatile memory. Non-volatile memory is a storage medium that does not require power to maintain the state of data stored by the medium. In one embodiment, the memory structure is a block addressable storage device, such as those based on NAND or NOR technologies. A storage device may also include future generation nonvolatile devices, such as a three dimensional (3D) crosspoint memory device, or other byte addressable write-in-place nonvolatile memory devices. In one embodiment, the storage device 16 may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor RAM (T-RAM) based memory device, or a combination of any of the above, or other memory. The term "storage device" may refer to the die itself and/or to a packaged memory product. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

In an embodiment, the block storage device 16 also includes volatile memory. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices that implement such standards may be referred to as DDR-based interfaces.

Figure 2A:
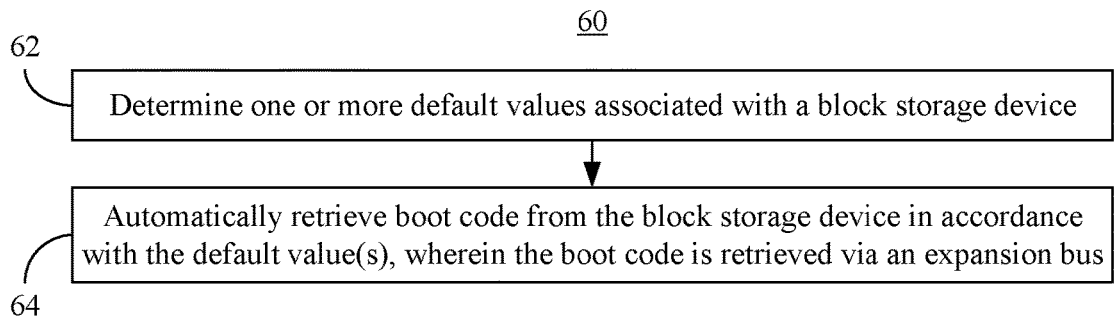
FIG. 2A is a flowchart of an example of a method of operating a bus controller according to an embodiment.

FIG. 2A shows a method 60 of operating a bus controller. The method 60 may generally be implemented in a bus controller such as, for example, the first bus controller 30 (FIG. 1), already discussed. More particularly, the method 60 may be implemented in one or more modules as a set of logic instructions stored in a machine- or computer-readable storage medium such as random access memory (RAM), ROM, programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 62 provides for determining one or more default values associated with a block storage device, wherein the default value(s) may be set at design time. In an embodiment, the default value(s) include bus number information and address information, wherein at least the address information corresponds to address information in a bus header of the block storage device. Block 62 may include, for example, retrieving at least one of the default value(s) from a configuration register, a ROM, etc., or any combination thereof. Illustrated block 64 automatically retrieves boot code from the block storage device in accordance with the default value(s), wherein the boot code is retrieved via an expansion bus. In an embodiment, retrieval of the boot code from the block storage device is initiated in response to completion of a training of the expansion bus. In one example, retrieval of the boot code from the block storage bypasses a bus enumeration procedure (not shown). Additionally, the block storage device may be dedicated to the bus controller.

Because the operating speed of the block storage device is typically higher than, for example, the operating speed of a flash memory (e.g., SPI flash memory), the illustrated method 60 enhances performance to the extent that booting from the block storage device is faster than booting from the flash memory. Indeed, cost and board space savings may be achieved by eliminating the flash memory from the system altogether.

Figure 2B:
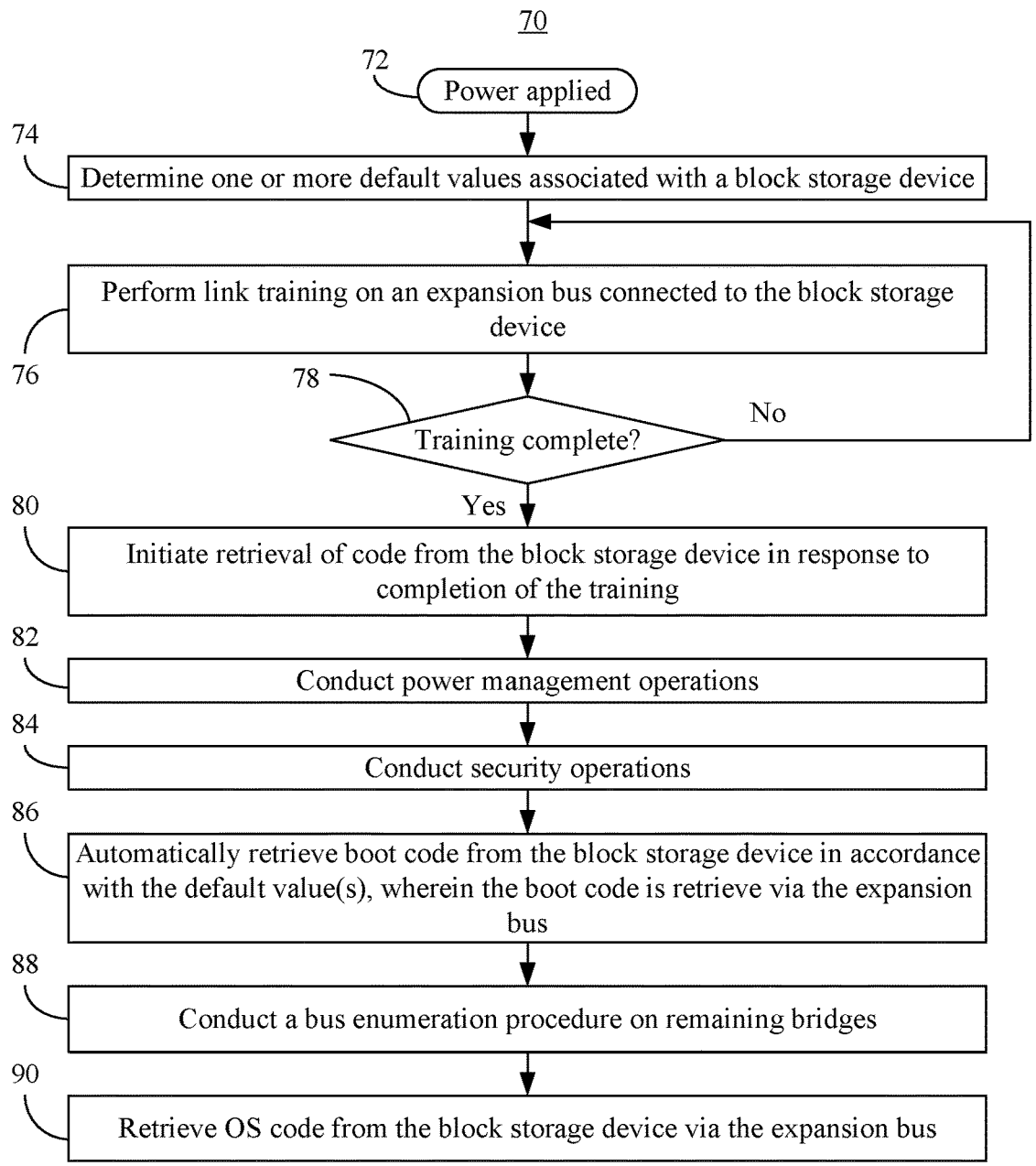
FIG. 2B is a flowchart of an example of a more detailed method of operating a bus controller according to an embodiment.

FIG. 2B shows a more detailed method 70 of operating a bus controller. The method 70 may generally be implemented in a bus controller such as, for example, the first bus controller 30 (FIG. 1), already discussed. More particularly, the method 70 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 72 applies power to a computing system and/or SoC containing the bus controller. Block 74 determines one or more default values associated with a block storage device. As already noted, the default value(s) may include bus number information and address information, wherein at least the address information of the default value(s) corresponds to address information in a bus header of the block storage device. Block 74 may include, for example, retrieving at least one of the default value(s) from a configuration register, a ROM, etc., or any combination thereof. Illustrated block 76 performs link training on an expansion bus connected to the block storage device. The link training may involve resolving communication problems at the transaction, data link and/or physical layer of the expansion bus. In an embodiment, a determination is made at block 78 as to whether the link training is complete. If not, the illustrated method 70 returns to block 76. Otherwise, block 80 initiates retrieval of code (e.g., power management, security and/or boot code) from the block storage device in response to completion of the training. Additionally, one or more power management operations (e.g., power management controller/PMC operations) may be conducted at block 82 and one or more security operations (e.g., converged security engine/CSE operation) may be conducted at block 84.

Illustrated block 86 automatically retrieves boot code from the block storage device in accordance with the default value(s), wherein the boot code is retrieved via the expansion bus. The block storage device may be dedicated to the bus controller. In one example, retrieval of the boot code from the block storage bypasses a bus enumeration procedure, which may be conducted on remaining bridges at block 88. In an embodiment, block 88 includes setting secondary and subordinate buses, determining whether a valid device is connected to the secondary bus, assigning resources to secondary bus devices and/or clearing secondary and subordinate buses before PCI-e NVMe devices are accessible. Thus, block 88 may be considerably time consuming. The method 70 may also retrieve OS code from the block storage device via the expansion bus at block 90.

Because the operating speed of the block storage device is relatively high compared to SPI, the illustrated method 70 enhances performance to the extent that booting from the block storage device is faster than booting from other sources. Indeed, cost and/or board space savings may be achieved by eliminating the other sources from the system altogether.

Figure 3:
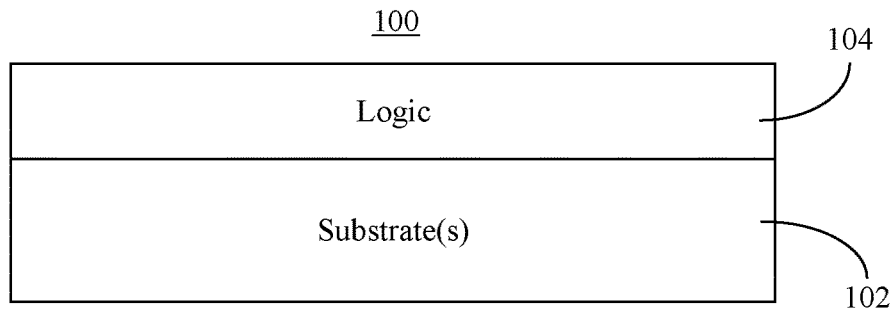
FIG. 3 is an illustration of an example of a semiconductor apparatus according to an embodiment.

FIG. 3 shows a semiconductor apparatus 100 (e.g., chip, die) that includes one or more substrates 102 (e.g., silicon, sapphire, gallium arsenide) and logic 104 (e.g., transistor array and other integrated circuit/IC components) coupled to the substrate(s) 102. The logic 104, which may be implemented at least partly in configurable logic and/or fixed-functionality hardware logic, may generally implement one or more aspects of the method 60 (FIG. 2A) and/or the method 70 (FIG. 2B), already discussed. Thus, the logic 104 may determine one or more default values associated with a block storage device and retrieve boot code from the block storage device in accordance with the default value(s), wherein the boot code is to be retrieved via an expansion bus. Thus, the logic 104 provides for enhanced performance and reduced cost.

In one example, the logic 104 includes transistor channel regions that are positioned (e.g., embedded) within the substrate(s) 102. Thus, the interface between the logic 104 and the substrate(s) 102 may not be an abrupt junction. The logic 104 may also be considered to include an epitaxial layer that is grown on an initial wafer of the substrate(s) 102.

ADDITIONAL NOTES AND EXAMPLES

Example 1 includes a semiconductor apparatus comprising one or more substrates and logic coupled to the one or more substrates, wherein the logic is at least partly implemented in one or more of configurable or fixed-functionality hardware, and the logic is to determine one or more default values associated with a block storage device and retrieve boot code from the block storage device in accordance with the one or more default values, wherein the boot code is retrieved via an expansion bus.

Example 2 includes the semiconductor apparatus of Example 1, wherein the one or more default values include bus number information and address information, and wherein the address information of the one or more default values corresponds to address information in a bus header of the block storage device.

Example 3 includes the semiconductor apparatus of Example 1, wherein the block storage device is to be dedicated to the semiconductor apparatus.

Example 4 includes the semiconductor apparatus of Example 1, wherein retrieval of the boot code from the block storage device bypasses a bus enumeration procedure.

Example 5 includes the semiconductor apparatus of Example 1, wherein the logic coupled to the one or more substrates is to initiate retrieval of the boot code from the block storage device in response to completion of a training of the expansion bus.

Example 6 includes the semiconductor apparatus of Example 1, further including one or more of a configuration register or a read only memory, wherein, to determine the one or more default values, the logic coupled to the one or more substrates is to retrieve at least one default value from one or more of the configuration register or the read only memory.

Example 7 includes the semiconductor apparatus of any one of Examples 1 to 6, wherein the logic coupled to the one or more substrates is to retrieve operating system code from the block storage device via the expansion bus.

Example 8 includes a computing system comprising a block storage device, an expansion bus coupled to the block storage device, a bus controller coupled to the expansion bus, the bus controller including logic to determine one or more default values associated with the block storage device, and retrieve boot code from the block storage device in accordance with the one or more default values, wherein the boot code is to be retrieved via the expansion bus.

Example 9 includes the computing system of Example 8, wherein the one or more default values include bus number information and address information, and wherein the address information of the one or more default values corresponds to address information in a bus header of the block storage device.

Example 10 includes the computing system of Example 8, wherein the block storage device is dedicated to the bus controller.

Example 11 includes the computing system of Example 8, wherein retrieval of the boot code from the block storage device bypasses a bus enumeration procedure.

Example 12 includes the computing system of Example 8, wherein the logic is to initiate retrieval of the boot code from the block storage device in response to completion of a training of the expansion bus.

Example 13 includes the computing system of Example 8, further including one or more of a configuration register or a read only memory, wherein, to determine the one or more default values, the logic is to retrieve at least one default value from one or more of the configuration register or the read only memory.

Example 14 includes the computing system of any one of Examples 8 to 13, wherein the logic is to retrieve operating system code from the block storage device via the expansion bus.

Example 15 includes a method of operating a bus controller, the method comprising determining one or more default values associated with a block storage device, and automatically retrieving boot code from the block storage device in accordance with the one or more default values, wherein the boot code is retrieved via an expansion bus.

Example 16 includes the method of Example 15, wherein the one or more default values include bus number information and address information, and wherein the address information of the one or more default values corresponds to address information in a bus header of the block storage device.

Example 17 includes the method of Example 15, wherein the block storage device is dedicated to the bus controller.

Example 18 includes the method of Example 15, wherein retrieval of the boot code from the block storage device bypasses a bus enumeration procedure.

Example 19 includes the method of Example 15, further including initiating retrieval of the boot code from the block storage device in response to completion of a training of the expansion bus.

Example 20 includes the method of any one of Examples 15 to 19, wherein determining the one or more default values includes retrieving at least one default value from one or more of a configuration register or a read only memory.

Example 21 includes the method of any one of Examples 15 to 20, further including retrieving operating system code from the block storage device via the expansion bus.

Example 22 includes means for performing the method of any one of Examples 15 to 21.

Example 23 includes at least one computer readable storage medium comprising a set of instructions, which when executed by a computing system, cause the computing system to perform the method of any one of Examples 15 to 21.

Technology described herein may therefore eliminate any need to include a SPI device on platforms to boot the firmware, which reduces the BOM. Indeed, the same storage device may be used for both BIOS and the OS. Additionally, boot times may be reduced by using a much quicker storage device as well as having the NVMe device accessible at SoC "power good." Such a solution may be particularly useful in IoT devices having tight latency constraints.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus comprising:
one or more substrates; and
logic coupled to the one or more substrates, wherein the logic is at least partly implemented in one or more of configurable or fixed-functionality hardware, and the logic is to:
determine one or more default values associated with a block storage device, wherein the block storage device is to store boot code and operating system code, and
retrieve the boot code from the block storage device in accordance with the one or more default values, wherein the boot code is to be retrieved via an expansion bus;
wherein the one or more default values include bus number information and address information, and wherein the address information of the one or more default values corresponds to address information in a bus header of the block storage device.

2. The semiconductor apparatus of claim 1, wherein the block storage device is to be dedicated to the semiconductor apparatus.

3. The semiconductor apparatus of claim 1, wherein retrieval of the boot code from the block storage device bypasses a bus enumeration procedure.

4. The semiconductor apparatus of claim 1, wherein the logic coupled to the one or more substrates is to initiate retrieval of the boot code from the block storage device in response to completion of a training of the expansion bus.

5. The semiconductor apparatus of claim 1, further including one or more of a configuration register or a read only memory, wherein, to determine the one or more default values, the logic coupled to the one or more substrates is to retrieve at least one default value from one or more of the configuration register or the read only memory.

6. The semiconductor apparatus of claim 1, wherein the logic coupled to the one or more substrates is to retrieve the operating system code from the block storage device via the expansion bus.

7. A computing system comprising:
a block storage device;
an expansion bus coupled to the block storage device;
a bus controller coupled to the expansion bus, the bus controller including logic to:
determine one or more default values associated with the block storage device, wherein the block storage device is to store boot code and operating system code, and
retrieve the boot code from the block storage device in accordance with the one or more default values, wherein the boot code is to be retrieved via the expansion bus;
wherein the one or more default values include bus number information and address information, and wherein the address information of the one or more default values corresponds to address information in a bus header of the block storage device.

8. The computing system of claim 7, wherein the block storage device is dedicated to the bus controller.

9. The computing system of claim 7, wherein retrieval of the boot code from the block storage device bypasses a bus enumeration procedure.

10. The computing system of claim 7, wherein the logic is to initiate retrieval of the boot code from the block storage device in response to completion of a training of the expansion bus.

11. The computing system of claim 7, further including one or more of a configuration register or a read only memory, wherein, to determine the one or more default values, the logic is to retrieve at least one default value from one or more of the configuration register or the read only memory.

12. The computing system of claim 7, wherein the logic is to retrieve the operating system code from the block storage device via the expansion bus.

13. A method of operating a bus controller, comprising:
   determining one or more default values associated with a block storage device, wherein the block storage device is to store boot code and operating system code; and
   automatically retrieving the boot code from the block storage device in accordance with the one or more default values, wherein the boot code is retrieved via an expansion bus;
wherein the one or more default values include bus number information and address information, and wherein the address information of the one or more default values corresponds to address information in a bus header of the block storage device.

14. The method of claim 13, wherein the block storage device is dedicated to the bus controller.

15. The method of claim 13, wherein retrieval of the boot code from the block storage device bypasses a bus enumeration procedure.

16. The method of claim 13, further including initiating retrieval of the boot code from the block storage device in response to completion of a training of the expansion bus.

17. The method of claim 13, wherein determining the one or more default values includes retrieving at least one default value from one or more of a configuration register or a read only memory.

\* \* \* \* \*